United States Patent
Gallitzdorfer

(10) Patent No.: US 11,277,016 B2
(45) Date of Patent: Mar. 15, 2022

(54) CHARGING DEVICE, METHOD FOR CHARGING A MOBILE TERMINAL, CONTROL UNIT AND MOTOR VEHICLE

(71) Applicant: AUDI AG, Ingolstadt (DE)

(72) Inventor: Torsten Gallitzdorfer, Riesa (DE)

(73) Assignee: AUDI AG, Ingolstadt (DE)

( * ) Notice: Subject to any disclaimer, the term of this patent is extended or adjusted under 35 U.S.C. 154(b) by 178 days.

(21) Appl. No.: 16/625,140

(22) PCT Filed: Jun. 19, 2018

(86) PCT No.: PCT/EP2018/066185
§ 371 (c)(1),
(2) Date: Dec. 20, 2019

(87) PCT Pub. No.: WO2018/234272
PCT Pub. Date: Dec. 27, 2018

(65) Prior Publication Data
US 2021/0336458 A1   Oct. 28, 2021

(30) Foreign Application Priority Data
Jun. 23, 2017 (DE) ...................... 10 2017 210 641.7

(51) Int. Cl.
*H02J 7/00* (2006.01)
*B60L 1/00* (2006.01)

(52) U.S. Cl.
CPC ............ *H02J 7/0044* (2013.01); *B60L 1/006* (2013.01); *H02J 7/00034* (2020.01); *H02J 7/0047* (2013.01); *H02J 2310/22* (2020.01); *H02J 2310/48* (2020.01)

(58) Field of Classification Search
CPC .... H02J 7/0044; H02J 7/0047; H02J 7/00034; H02J 2310/22; H02J 2310/48; H02J 7/00; B60L 1/006; B60L 1/00
See application file for complete search history.

(56) References Cited

U.S. PATENT DOCUMENTS

| 2012/0313576 | A1   | 12/2012 | Peiker |
|---|---|---|---|
| 2013/0147426 | A1   | 6/2013  | Misono |
| 2013/0265006 | A1 * | 10/2013 | Fraczek ............... H01R 13/707 320/109 |

FOREIGN PATENT DOCUMENTS

| DE | 10 2012 018824 A1 | 3/2014 |
|---|---|---|
| EP | 2 747 236 A1 | 6/2014 |

OTHER PUBLICATIONS

Examination Report dated Nov. 6, 2020 in corresponding European Application No. 18 732 742.4; 6 pages including partial machine-generated English-language translation.
(Continued)

*Primary Examiner* — Vuthe Siek
(74) *Attorney, Agent, or Firm* — Maier & Maier, PLLC

(57) ABSTRACT

A charging device for a motor vehicle, wherein at least one rod element, which has a first end with a cross-sectional surface, which forms a part of a holding surface of the charging device, and wherein a main extension axis of the at least one rod element intersects the part of the holding surface such that a second end, opposite the first end, of the at least one rod element is facing away from the part of the holding surface and protrudes into the charging device, an adjustment device for adjusting the at least one rod element along the main extension axis, and an energy output device with at least one energy output element, wherein the energy output device is designed to output energy to an energy storage.

13 Claims, 6 Drawing Sheets

(56) References Cited

OTHER PUBLICATIONS

International Preliminary Report on Patentability (Chapter I) dated Jan. 2, 2020, in corresponding International application No. PCT/EP2018/066185; 7 pages.
International Search Report and Written Opinion of the International Searching Authority dated Jul. 26, 2018 in corresponding International application No. PCT/EP2018/066185; 24 pages including Machine-generated English-language translation.

* cited by examiner

CHARGING DEVICE, METHOD FOR CHARGING A MOBILE TERMINAL, CONTROL UNIT AND MOTOR VEHICLE

FIELD

The invention relates to a charging device for a motor vehicle for charging an energy storage device of a mobile terminal with energy. The invention likewise relates to a method for charging the energy storage device of the mobile terminal, wherein the term energy storage device is understood to be a component or a device component for storing energy, for example current. The energy storage device may be designed, for example, as a battery.

BACKGROUND

Today's modern inductive charging devices, so-called charging cradles, are usually situated in vehicles in a fixed location defined by the manufacturer. They are usually strongly recessed so that the mobile terminal is well retained during driving and is protected against slipping or falling out. A rubber mat often helps in this case.

Their defined universal size should be usable for as many different mobile terminals as possible. Thus, no customized charging cradle is available, but instead it is usually defined to be larger in the dimensions thereof. Large chamfers on the sides of the charging device cradle should ensure easy removal of the mobile terminal after charging. Optionally, a telephone is placed in this device, and the telephone is automatically inductively charged, i.e. wirelessly, without an additional plug connection.

A display of the state of charge, i.e. information as to whether a device has been completely charged, usually takes place via the display of the mobile terminal or a screen of an instrument cluster.

Locations of the charging device in the motor vehicle are always permanently defined and do not enable any customization of the charging process. Thus, a mobile terminal can only be charged there. Sometimes no exact charging is possible, depending on the type and size of the mobile terminal, due to the universal size of the charging device recess. Repositioning by the user is necessary in order to enable correct charging and/or a correct energy flow.

The charging cradle is rigid and cannot be adapted to the respective mobile terminal. Frequently, such charging cradles can be somewhat rather unfavorable to reach for the user of the motor vehicle and, in such a case, the user must extend the body far under some circumstances in order to place or remove the mobile terminal.

Usually, the entire surface in a charging cradle is charged with current, resulting in high energy consumption, wherein low efficiency is evident. Due to the universal form of the charging cradle, large-scale energy is transferred. Because the size of the mobile terminal and the charging station are usually not identical and thus not congruent, selective, efficient, and precise charging takes place between the energy storage device of the mobile terminal and the charging device, which results in high energy loss in the transfer.

There may be problems when removing the mobile terminal with long fingernails. The indication of the state of charge, of a screen of an instrument cluster for example, is informative but frequently multiple types of different information are generated via such a screen such that even more information must be sorted by the user through the display of the state of charge.

SUMMARY

An object upon which the invention is based is the increasing of efficiency of a charging process when charging a mobile terminal in the motor vehicle.

The invention is based on the idea of providing a charging device, which has at least one rod element adjustable in its main extension axis, preferably a plurality of rod elements, wherein the at least one rod element forms a holding element, i.e. a holding cradle for example. The charging device according to the invention has an energy output device, with which an energy storage device of the mobile terminal can be charged by means of the at least one rod element. An intelligent system for recognizing and charging mobile terminals is thereby provided, which forms a charging cradle, i.e. the holding element, which is fitted or at least partially fitted to a form of the mobile terminal. The adaptation of the form of the holding element thus takes place fitted to the mobile terminal.

The charging device according to the invention for a motor vehicle may be designed, for example, as part of an interior trim element of the motor vehicle or form the interior trim element, wherein the interior trim element may be, for example, a center console or a dashboard or an armrest. The charging device according to the invention is characterized by at least one rod element, i.e. at least one longitudinal element with a predominantly straight body, the length of which is greater than its remaining dimensions and the resulting cross-sectional surface. The rod element may be designed, for example, as a pin or rod. The at least one rod element has a first end with a cross-sectional surface as the end face, wherein the cross-sectional surface may also be characterized, for example, as an end face or front side of the contact surface. The cross-sectional surface of the first end forms a part of a holding surface of the charging device.

A main extension axis of the at least one rod element intersects the cross-sectional surface of the first end and thus of the holding surface such that a second end, opposite the first end, of the at least one rod element is facing away from the holding surface and protrudes into the charging device.

The charging device additionally has an adjustment device for adjusting the at least one rod element along the main extension direction of the at least one rod element. In other words, the at least one rod element can be shifted out of the charging device or into the charging device.

The charging device according to the invention is furthermore characterized by an energy output device with at least one energy output element, wherein the energy output device is designed for outputting energy to the energy storage device of the mobile terminal by means of the at least one energy output element. An energy output device in this case is understood to be a device component or a component that is designed for outputting energy and may be designed, for example, as a component with a current source and an induction coil as the energy output element. Preferably, the at least one rod element comprises the energy output element in this case. A direct transfer of current and thus an efficient transfer of energy is hereby enabled.

This results in the aforementioned advantages, and the previously described disadvantages are reduced. The charging device according to the invention provides a freely selectable location for inductive charging of a generous surface. This results in a very large amount of freedom for the user of the motor vehicle when storing the mobile terminal and a very efficient charging process.

The charging device according to the invention enables a selective and efficient innovative charging of the mobile terminal, which results in energy savings and a reduction in the excessively large magnetic fields. The charging device according to the invention produces fewer disruptive magnetic waves that can have a negative impact on the entire system. Furthermore, the charging device according to the invention enables an adaptation to various usage scenarios. The adjustment device can prepare precise, fitted retaining and charging, for example, by means of the retrieval of information or an information datasheet of the mobile terminal in real time when the motor vehicle is approached or accessed. The charging device according to the invention additionally enables practically perfect removal and mounting while driving.

According to an especially preferred embodiment of the charging device according to the invention, it is characterized in that it has a plurality of rod elements, wherein each of the rod elements is arranged to be adjustable along its respective main extension axis, and wherein the respective cross-sectional surfaces form the part of the holding surface of the charging device. In this process, the adjustment device may be designed to adjust a part or each of the rod elements, preferably to adjust each of the rod elements independently of the other rod elements.

With such a charging device, holding elements can be formed at various positions such that different physical circumstances of the user or sitting positions of different users can be addressed especially advantageously. In addition, the holding element can be placed in a different position, while the mobile terminal is mounted in the holding element or thereby retained such that the mobile terminal can be moved from a first position into a further position. For example, the mobile terminal can thus be moved closer to a hand of the user or the mobile terminal may be moved, for example, upon a change in the sitting position, into a position that is more beneficial for the new sitting position.

In this process, the energy output device is designed to output energy via a part of the rod elements or each of the rod elements. Preferably, each of the rod elements may have an energy output element in this case.

According to a further embodiment of the charging device according to the invention, it may have an antenna device for providing a data communication connection. An antenna signal can hereby be amplified and transferred to an antenna of the mobile terminal. This results in an improved reception of the mobile terminal.

The charging device may optionally have a scratch protection device, i.e. a component for reducing a risk of scratching of the mobile terminal. The scratch protection device may at least partially cover a part of a surface of the at least one rod element. For example, the scratch protection device for each of the rod elements may have a rubber cover, which can at least partially enclose the respective rod element and may at least partially cover the cross-sectional surface. For example, friction of the mobile terminal on the rod element is thereby reduced.

According to a preferred embodiment of the charging device according to the invention, it may have an output device, i.e. a device or a device component or a component for displaying a screen content and for outputting light, said output device possibly being designed, for example, as a screen and/or light. The output device may preferably be designed as a display and/or lighting device, i.e. as a component for outputting a screen content and/or light. The output device may have, for example, at least one output element and/or at least one lighting element, which may be arranged in and/or on the cross-sectional surface of the first end of the at least one rod element. For example, each of the rod elements may have a screen on the first end as the output element.

Such a charging device can respond autonomously and independently to new requirements. For example, new settings can be carried out on-site; for example, the exemplary screen of the at least one rod element or a totality of screens of several rod elements can generate a light signal or displayed content, for example information regarding a state of charge of the energy storage device, or the rod elements forming the holding element can show the user where the user can place the terminal device, for example by means of lighting a bulb or light-emitting diode (LED) or organic LED (OLED). These cross-sectional surfaces may additionally ensure a very decorative look, for example, by installing digital graphics, for example, on several rod elements, the output device of which may have, for example, a screen for each. For example, when the user approaches the motor vehicle, information, data, or updates, which can be automatically retrieved, can be displayed by the system via the personal mobile device, or information as to where the mobile terminal can be placed so that it is always accessible can be displayed or highlighted, for example. If the output device, for example, has a speaker, not only visual or physical signals but also acoustic signals can be generated to advise the user of the approximate state of charge.

The aforementioned object is achieved by means of the method according to the invention for charging an energy storage device of a mobile terminal, characterized by the following steps executed by a control unit. The control unit in this case is understood to be a device or a device component for receiving and evaluating signals as well as for generating control signals. The control unit may be designed, for example, as a control unit or control board.

Initially, a holding element for storing the mobile terminal is provided by means of an embodiment of the charging device according to the invention, wherein the holding element is formed by a totality of cross-sectional surfaces, which form the part of the holding surface. This is followed by generating a charging signal that describes an activating of the at least one energy output element by means of the energy output device. The generated charging signal is transferred to the energy output device for outputting the energy to the energy storage device of the mobile terminal.

This results in the aforementioned advantages.

In one embodiment of the method according to the invention, a current or suitable position/or location of the mobile terminal on the charging device can be determined by means of the control unit, and the respective rod element or respective rod elements that form the holding element can be determined as a function of the determined position and/or location. In this process, the charging signal can describe the output of energy by means of the determined rod element or the determined rod elements. In other words, energy is only transferred by the respective rod elements that have contact or will have contact with the energy storage device of the mobile terminal. This hereby results in high energy savings.

For example, the control unit may execute a determining of a position and/or location of the energy storage device in the mobile terminal, for example by retrieving information with respect to this from an onboard computer or by retrieving an information datasheet from the Internet. The respective rod element or the respective rod elements that are arranged or will be arranged on the energy storage device can be determined as a function of the determined position and/or location of the energy storage device. The charging signal can thus describe the determined rod elements or the determined at least one rod element. A charging process is hereby designed more efficiently and even more energy is saved.

Initially, a form of the mobile terminal that can be situated in the interior of the motor vehicle can be determined according to a further embodiment of the method in accordance with the invention. For example, a scanning device of the motor vehicle can scan a user of the motor vehicle upon entry into the motor vehicle and, in doing so, determine what mobile terminal the user is carrying. Using image processing software for example, the type or form of mobile terminal can be determined by means of pattern detection. Alternatively, the user can input the model of the mobile terminal, for example, via an infotainment system of the motor vehicle. The form can be determined by means of a corresponding user input.

In addition, a position of the charging device that is suitable for storing the mobile terminal is determined.

A holding surface form default signal, which describes an adjusting of the at least one rod element of the holding device along its main extension axis, is generated as a function of the determined form of the mobile terminal and the determined position.

The generated holding surface form default signal is transferred to the adjustment device of the charging device in order to adjust the at least one rod element, and thereby the holding element is formed such that the part of the holding surface formed by a totality of cross-sectional surfaces forms a holding element at least partially fitted to the determined form, in the determined position.

In one refinement, the control unit can execute determining of a model of the mobile terminal, for example as a function of a sensor signal of a sensor of the motor vehicle or as a function of information transferred to the control unit by the mobile terminal. The form of the mobile terminal can then be determined by means of the determined model. The charging process can hereby follow especially individually and thereby especially efficiently.

According to a further refinement of the method according to the invention, the control unit can execute a determining of a position or location change of a body of the user, for example with the assistance of a sensor of a motor vehicle seat or a camera. The control unit can likewise execute a determining of a current position of the holding element. As a function of the determined position or location change, an alternative position of the holding element can be determined, in which the mobile terminal mounted in the holding element is more easily accessible from the changed body position and/or body location, and a further holding surface form default signal can be generated, which can describe an adjusting of a plurality of rod elements in order to move the holding element from the current position into the determined alternative position. Subsequently, the control unit can execute a transfer of the further holding surface form default signal to the adjustment device. The mounted mobile terminal can hereby be moved, for example, closer to the user upon a change in the body position of the user without the user having to take the mobile terminal and move it closer. This also results in increased driving safety because the user does not have to worry with the repositioning of the mobile terminal or does not have to bend far forward, for example, the next time the user wishes to have the mobile terminal.

A lighting signal, which can describe a lighting of the holding element, can be generated as a function of the determined suitable position on the charging device and/or of a position of the holding element. The generated lighting signal can be transferred to the output device of the charging device for a) controlling the output and/or lighting element of the at least one rod element, i.e. for controlling a screen of the at least one rod element for example; and/or b) controlling the lighting element that impacts the at least one rod element with light. The user can thus much more quickly determine the site of the charging device at which the holding element was formed or will be formed both in darkness and in daylight, and the user does not have to search a long time, for example under poor light conditions or extensive light contrasts, for the particular site at which the user can place the mobile terminal. Driving safety is also hereby increased, because the user does not have to pay a lot of attention to searching for the holding element.

The aforementioned object is achieved, with achievement of the previously mentioned advantages, by means of an embodiment of a control unit according to the invention, which is configured to execute method steps related to a control unit according to one of the previously described embodiments of the method according to the invention. The control unit may preferably have a processor device, i.e. a device for electronic data processing, which may preferably have at least one microcontroller and/or at least one microprocessor. The optional processor device can be configured to execute a program code stored in a data memory, wherein the program code is configured, upon execution by the processor device, to prompt the control unit to execute method steps related to a control unit. The control unit according to the invention can be presented, for example, as a control board of the charging device or as a control unit of the motor vehicle.

The aforementioned object is achieved by means of a charging device according to the invention in accordance with one of the previously described embodiments, which is characterized by an embodiment of the control unit according to the invention.

The aforementioned object is achieved by means of a motor vehicle, which may be designed, for example, as a car, for example as a passenger car. The motor vehicle is characterized by an embodiment of the control unit according to the invention and/or an embodiment of the charging device according to the invention.

BRIEF DESCRIPTION OF THE DRAWINGS

Exemplary embodiments of the invention are described in the following. The following is shown.

DETAILED DESCRIPTION

Figure 1:
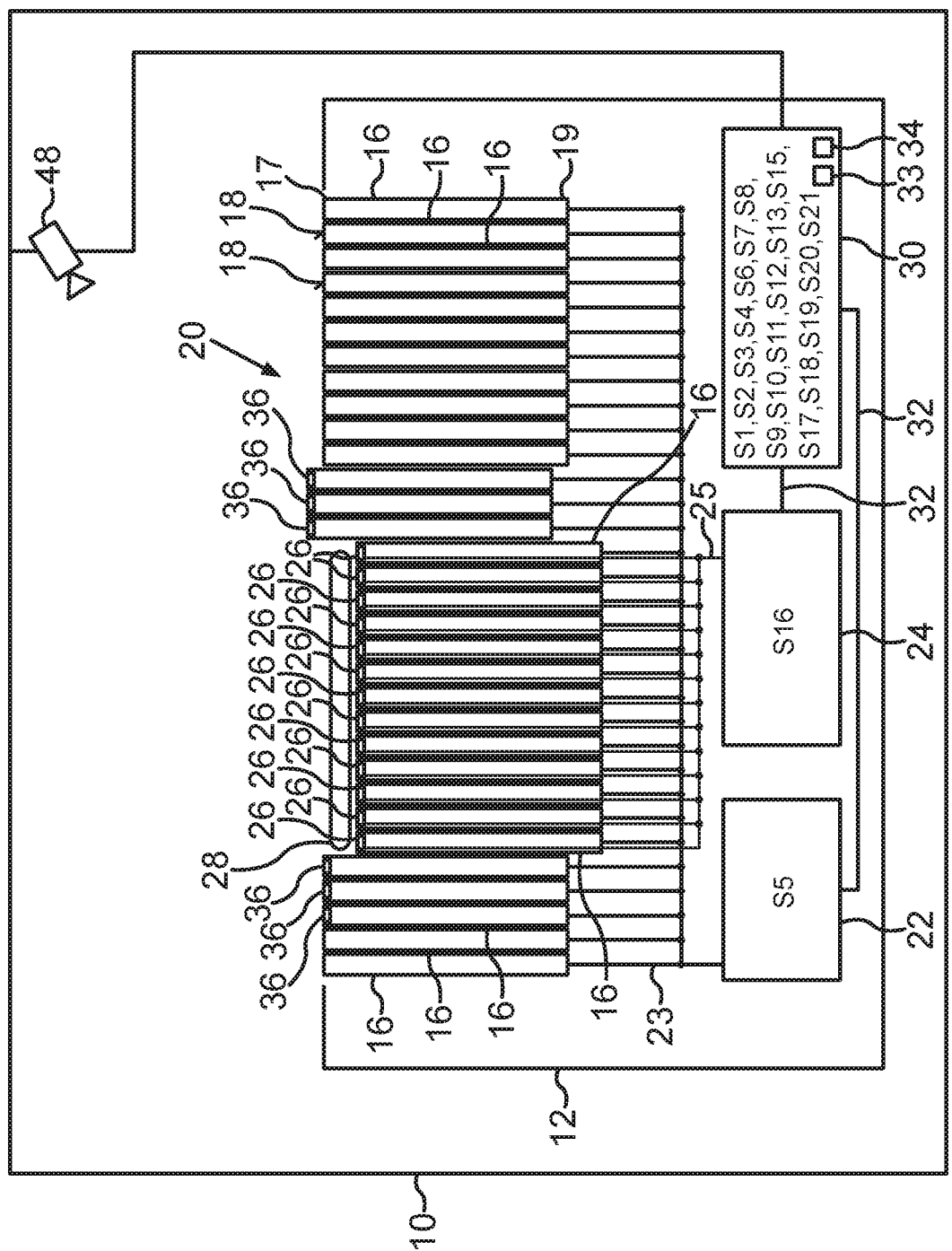
FIG. 1 a schematic view of a first embodiment of the charging device according to the invention and of a first embodiment of the method according to the invention.

The exemplary embodiments explained in the following refer to preferred embodiments of the invention. With the exemplary embodiments, the described components of the embodiments represent individual features of the invention that are to be considered independently of one another, each of which also further develop the invention independently of one another and thus also are to be considered individually or in a combination that is different than the one shown as a component of the invention. Furthermore, the described embodiments can also be supplemented through further described features of the invention.

In the figures, elements which are functionally equivalent are each given the same reference numerals.

FIG. 1 illustrates the principle of the charging device 12 according to the invention by means of a first exemplary embodiment. To this end, FIG. 1 shows a motor vehicle 10, which may be designed, for example, as a passenger car. The charging device 12 may be integrated, for example, in an interior trim element, for example in the center console of the motor vehicle 10, or may form such an interior trim element.

The charging device 12 from FIG. 1 has a plurality of rod elements 16, wherein not all of the rod elements 16 are indicated with reference numeral 16 in FIG. 1 (as well as in the further figures) for the sake of clarity. In the example from FIG. 1, a respective rod element 16 may be designed, for example, as a pin and have a first end 17 and an opposite end 19, wherein a cross-sectional surface 18 of the first end 17 is oriented toward an external region of the charging device 12 such that the cross-sectional surfaces 18 form a holding surface 20. A rod element 16 may have, for example, a length of several centimeters, for example a length in a range of from 0.5 cm to 10 cm, preferably between 0.5 cm and 5 cm. A dimension, for example a diameter, of the cross-sectional surface 18 may amount to 5 mm for example.

The charging device 12 has an adjustment device 22, which may also be characterized as a setting device. The adjustment device 22 may have, for example, a component with a motor or with technology for raising and lowering the rod elements 16, which is known from the prior art to one skilled in the art, for example by means of a technology that is known from the area of Dynamic Physical Rendering (DPR), a sub-area of research of nanotechnology in convergence with robotics, and involves the process of the dynamic arrangement of intelligent material particles into actually existing macrobodies of any programmable form (programmable matter). The charging device 12 in this case may have such DPR technology for controlling the rod elements 16 as is known to one skilled in the art, for example, from the MIT Media Lab (Tangible Media Group).

FIG. 1 in this case shows a communication device 23, for example an electrical connection from the exemplary motor to the respective rod elements 16. In the example from FIG. 1, the individual rod elements 16 may be adjusted along their main extension axis independently of one another, i.e. moved out of the charging device or lowered into the charging device for example. The adjustment device 22 may optionally have, for example, a matrix arranged under the rod elements 16, said matrix optionally having one or more magnets, preferably a magnet for each of the rod elements 16.

Figure 6:
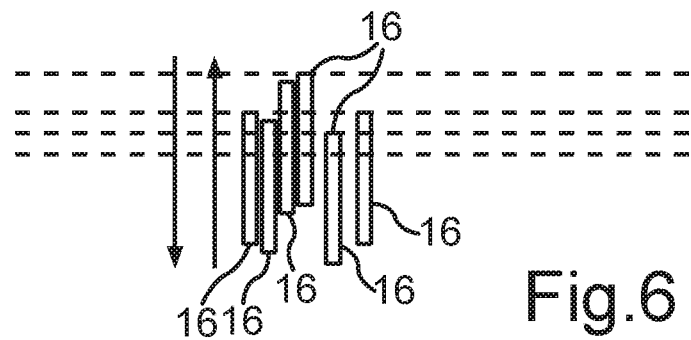
FIG. 6 a schematic view of a further embodiment of the charging device according to the invention.

Alternatively or additionally, the respective rod elements 16 may be subjected to pretension, wherein the corresponding rod element 16 can be moved into one of the two directions upon a release of the pretension. Preferably in this case, the adjustment device 22 can be configured to execute a stepless movement of the individual rod elements 16. To this end, FIG. 6 shows an example of several rod elements 16 arranged next to one another, wherein the individual rod elements 16 can be continuously variably set at different heights by means of a movement into one of the directions indicated by the two arrows. The dashed lines in this case illustrate the different heights of the individual rod elements 16. For the sake of clarity, the further components of the charging device 12 are not shown in FIG. 6.

FIG. 1 shows an energy output device 24, which has, for example, a current source, several energy output elements 26, and a corresponding electrical connection 25 to the individual energy output elements 26. In the example from FIG. 1, each of the rod elements 16 may have an energy output element 26, which may be arranged, for example, underneath or on the cross-sectional surface 18. In FIG. 1, for the sake of clarity, the respective energy output elements 26 are only shown in those rod elements 16 that are situated under a mobile terminal 28 in the example from FIG. 1. The energy output device 24 may optionally have one or more contact sensors (not shown in FIG. 1), which may be arranged at the rod elements 16, for example, under the rod elements 16, such that the energy output element 26 can be activated by means of the exemplary contact sensor upon placement of the mobile terminal 28. The energy output element 26 may be designed, for example, as an induction coil.

Figure 4:
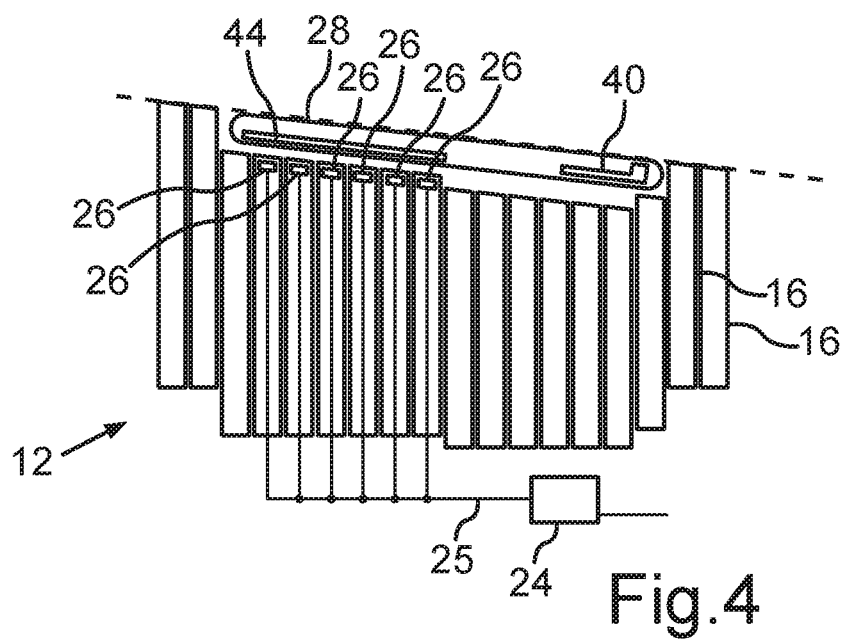
FIG. 4 a schematic view of a further embodiment of the charging device according to the invention and of a further embodiment of the method according to the invention.

In a section from FIG. 1, FIG. 4 shows the mobile terminal 28 with the energy storage device 44, which may be designed, for example, as a battery of the mobile terminal 28. FIG. 4 likewise shows the rod elements 16, in which only a few energy output elements 26 are shown for the sake of clarity. The arrows shown in FIG. 4 indicate the direction in which the energy, preferably current, can be conducted. For the sake of clarity, not all components of the charging device 12 are shown in FIG. 4.

The charging device 12 from FIG. 1 likewise has an optional control unit 30, which may be designed, for example, as a control board, and may optionally have a processor device 33 and/or a data memory 34, wherein a program code for executing the method according to the invention may be stored, for example, in the data memory 34. The processor device in this case may have, for example, several microprocessors and/or microcontrollers.

The control unit 30 may be connected to the energy output device 24 and the adjustment device 22 by means of a data communication connection 32. Such a data communication connection may be, for example, a wireless or a wired data communication connection, for example a WLAN or Bluetooth connection, or a data bus.

FIG. 1 likewise shows some rod elements 16, each having an output device 36, which can be connected to the control unit 30, for example, via a data communication connection (not shown in FIG. 1 for the sake of clarity). In the example from FIG. 1, each of the rod elements 16 in this case has one output device 36 and one energy output element 26 each, for example.

The output device 36 may have, for example, a lighting element, for example an LED or an OLED, and/or a screen, which may have, for example, at least one LED or OLED or may be designed as an LCD screen. The output device 36 may be arranged, for example, on the cross-sectional surface 18. The individual output devices 36, or a totality or a part of the output devices 36, may display, for example, a state of charge of the energy storage device (not shown in FIG. 1) of the mobile terminal 28. This can be determined, for example, by the energy output device 24. Corresponding information can be evaluated by the control unit 30, and the control unit 30 can generate, for example, a display signal, which can correspondingly control the output device 36 or the output devices 36. Alternatively, the output device 36 or the output devices 36 may display, for example, a remaining charging time.

Optionally, the output device 36 may have a speaker, which may be arranged, for example, within one of the rod elements 16 or, for example, in a casing of the charging device 12. An acoustic feedback signal can be generated, for example, by such an output device 36 once the mobile terminal 28 is charged.

The individual output devices 36 from the example in FIG. 1, may generate, for example, a black light, wherein corresponding technologies are known from the prior art. Alternatively or additionally, the output device 36 or the output devices 36 may be designed such that they can be arranged, for example, on a side surface of the respective rod element 16 such that the respective rod element 16 can light up for example. In a further example, the output device 36 may be designed such that a light core or light spot can be emitted on the corresponding cross-sectional surface 18. To this end, a selective light conductor or a light conductor having a selective decoupling point can be arranged within the respective rod element 16, and/or the cross-sectional surface 18 may have, for example, a transcendent film. Alternatively or additionally, the output device 36 may be designed for toggling the exemplary screen from an opaque appearance to a transparent appearance according to technologies from the prior art known to one skilled in the art.

Figure 5:
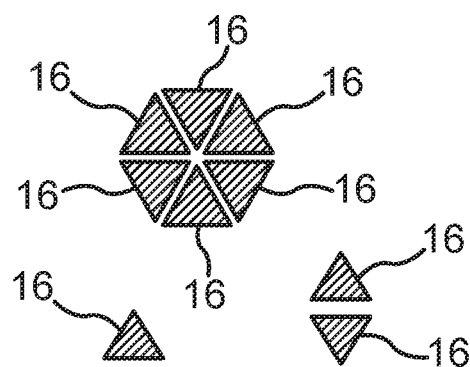
FIG. 5 a schematic view of an embodiment of exemplary rod elements.

FIG. 5 shows exemplary designs and arrangements of rod elements 16. In the example from FIG. 5, they are designed, for example, with a triangular cross-section, which may alternatively be, for example, round or squared or otherwise polygonal. FIG. 5 shows, for example, an individual rod element 16 in one view, two rod elements 16, which may be in contact with one another, and a group of, for example, several rod elements 16, each of which has a triangular cross-section and can be arranged in the manner shown with respect to one another.

Figure 13:
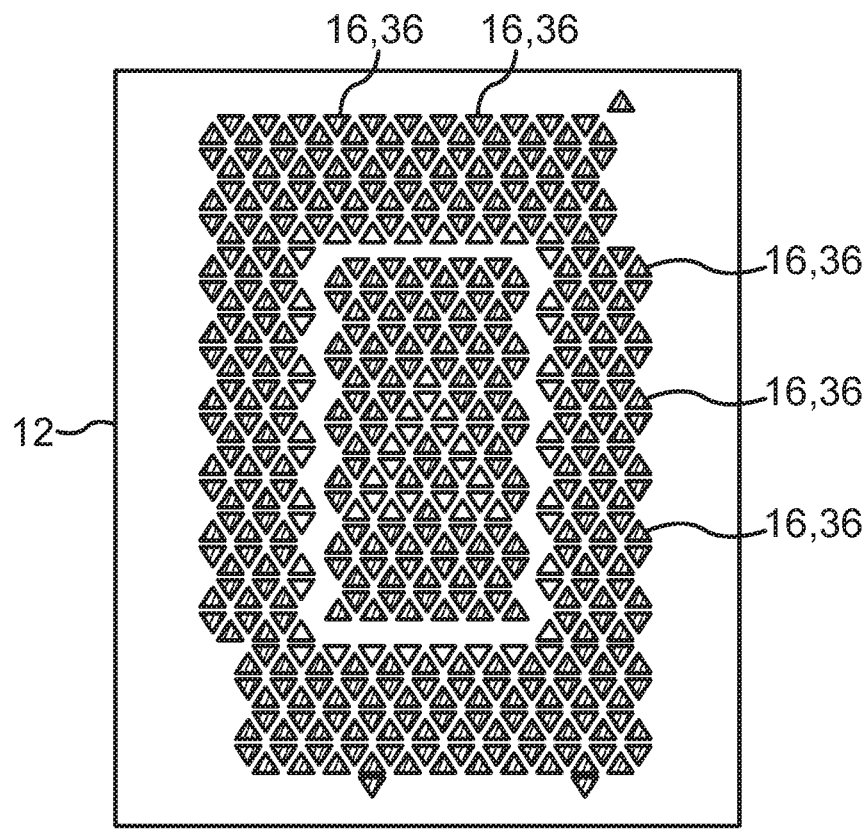
FIG. 13 a schematic view of a further embodiment of the charging device according to the invention and of a further embodiment of the method according to the invention.

FIG. 13 shows an exemplary arrangement of a plurality of rod elements 16, which may have, for example, one output device 36 with one output element each, for example a screen. The rod elements 16 shown in the hatched area may generate, for example, a black light or have a black film on the cross-sectional surface 18, while the rod elements 16 not in the hatched area can generate, for example, a blue light or a white light. FIG. 13 illustrates the interaction among several output devices 36 of the plurality of rod elements 16, which can be interconnected in their entirety as a single screen. The block of rod elements 16 compiled in the middle, indicated by a white outline, may comprise rod elements 16 that have lowered. The white outline shown in FIG. 13 in this case is intended to illustrate the height difference as compared to the lowered rod elements 16, as a perspective measure. While the colorless rod elements 16 shown in the inner, lowered block of rod elements 16 can generate, for example, a logo of the mobile terminal 28, the colorless rod elements 16 shown as a lowered block by the outline may light up, for example, in a light color such that the holding element formed by the lowered rod elements 16 can be emphasized. The user can thereby immediately determine where the mobile terminal 28 should be placed.

Figure 2:
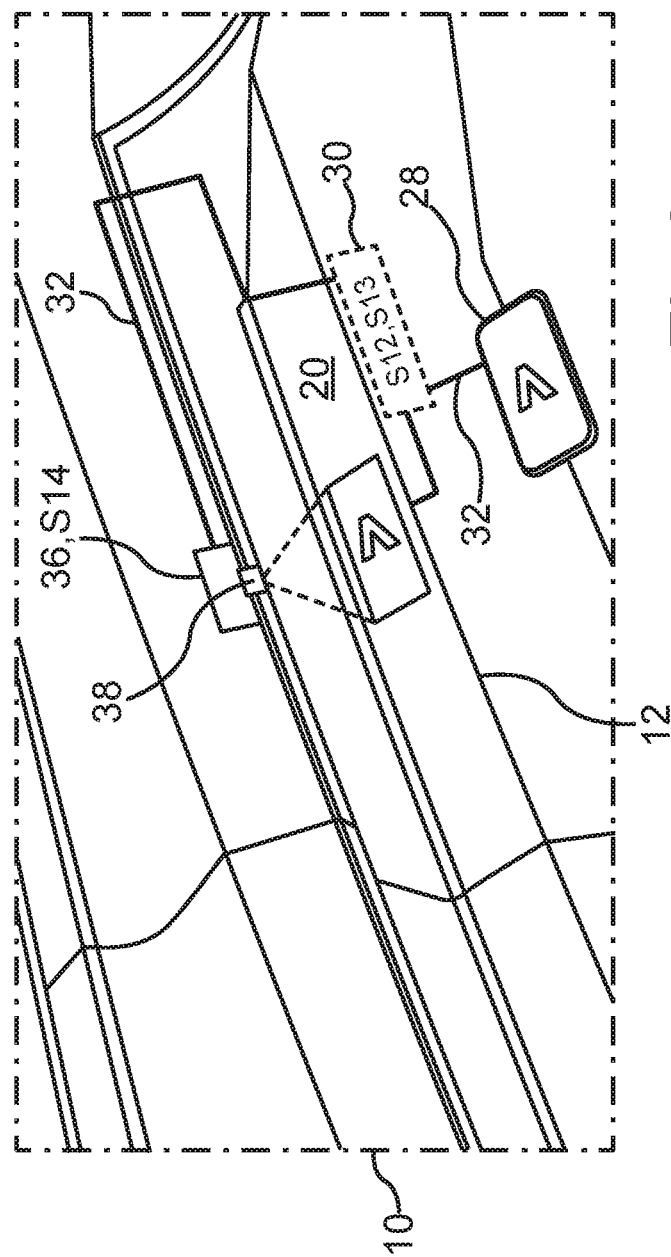
FIG. 2 a schematic view of a further embodiment of the charging device according to the invention and of a further embodiment of the method according to the invention.

In addition to the exemplary screens of the sectional surfaces 18, FIG. 2 shows an additional or alternative output device 36, which can be arranged, for example, above the contact surface 20 and can be installed, for example, in a corresponding interior trim element. The exemplary output device 36 has, for example, at least one lighting element 38, for example a light diode or a bulb. Such an output device 36 can illuminate, for example, the holding element formed by the charging device 12.

It may optionally be provided that output content, which can be generated by the mobile terminal 28, can be projected onto the holding surface 20, for example, via the control unit 30. In this example, the output device 36 can be designed, for example, as a projector. Suitable technologies for mirroring a screen content of a mobile terminal 28, so-called mirror-link technologies, are known from the prior art to one skilled in the art. There may be suitable data communication connections 32 between the output device 36 with the lighting element 38 and the control unit 30 as well as between the control unit 30 and mobile terminal 28, for example a WLAN or Bluetooth connection between the control unit 30 and the mobile terminal 28 as well as, for example, a wired data communication 32 between the control unit 30 and the output device 36. The charging device 12 from FIG. 2 may be, for example, a charging device 12 shown in FIG. 1 with the corresponding variations described herein.

Figure 3:
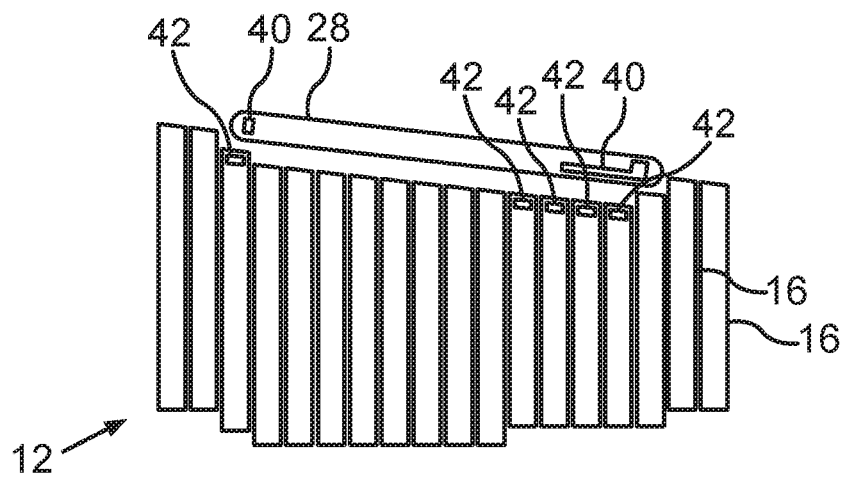
FIG. 3 a schematic view of a further embodiment of the charging device according to the invention and of a further embodiment of the method according to the invention.

FIG. 3 shows an exemplary embodiment of the charging device 12 according to the invention, for example the charging device 12 from the example in FIG. 1, wherein only the differences are addressed in the following. The mobile terminal 28 from FIG. 3 shows an antenna device 40 of the mobile terminal 28, which may be designed, for example, as an antenna signal amplifier. Some or several or all of the rod elements 16 may each optionally have an antenna device 42, which may be designed, for example, as a fractal antenna or GSM antenna. FIG. 3 in this case shows how close the antenna devices 42 are to the corresponding antennas 40 of the mobile terminal 28. Such an antenna device 42 of the at least one rod element 16 enables use of the rod element 16—and/or of the motor vehicle 10—as antennas to amplify and thus stabilize the antenna signal and thus improve, for example, a connection to a provider or satellites.

Figure 14:
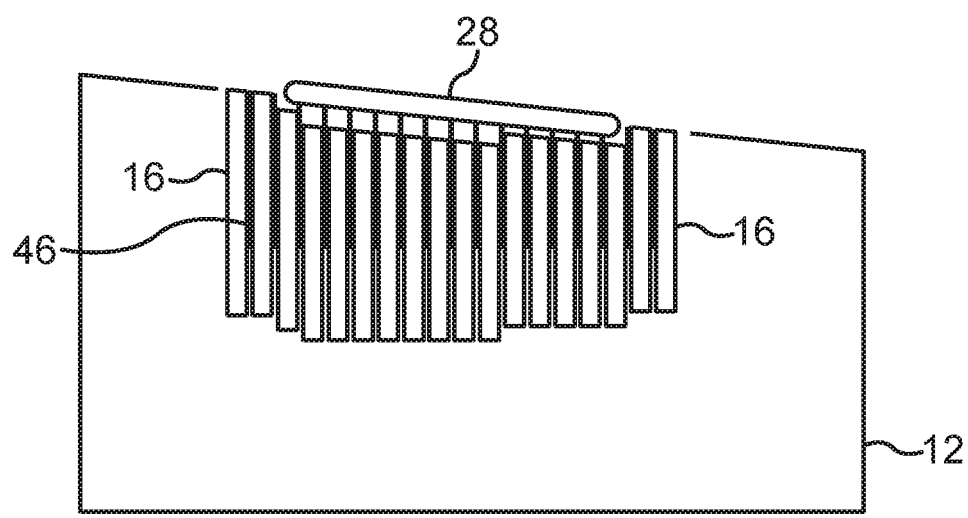
FIG. 14 a schematic view of a further embodiment of the charging device according to the invention and of a further embodiment of the method according to the invention.

FIG. 14 shows an example of a charging device 12, which may be designed, for example, as the charging device 12 from FIG. 1, wherein only the additional features or differences are described in the following. The charging device 12 from FIG. 14 has a scratch protection device 46, which may comprise, for example, rubber buffer bars between the individual rod elements 16. Alternatively, the scratch protection device 46 may provide, for example, a rubber tube or rubber sleeve for each of the rod elements 16. The exemplary rubber buffer bars can protect the mobile terminal 28 from slipping or rubbing on the rod elements 16. The scratch protection device 46 in this case may protrude slightly, for example, over the rod element 16 and/or lower itself when the rod element 16 lowers. An example protrusion of such exemplary rubber buffer bars may amount to, for example, a tenth of a length of the corresponding rod element 16.

FIG. 1 further shows the principle of the method according to the invention by means of an exemplary embodiment. In an optional method step S1, the control unit 30 may determine a model of the mobile terminal 28. To this end, the mobile terminal 28 can transfer corresponding information to the control unit, for example via a data communication connection (not shown in FIG. 1), or the control unit 30 can receive, for example, a sensor signal from a sensor 48, which may be designed, for example, as a camera or scanner, wherein the sensor signal may describe, for example, a camera image, on which the mobile terminal 28 can be captured. The control unit can optionally query a model of the mobile terminal 28 recorded by the sensor 48, for example, via a mobile communication connection or Internet connection. The exemplary camera image, which may be described by the sensor signal, can be evaluated, for example, with the assistance of image analysis software, wherein there can be differentiation, for example, between a handbag, a person, and the mobile terminal 28.

A form of the mobile terminal 28 can be determined in method step S2, for example, by means of the determined model. In method step S3, a position for storing the mobile terminal 28 can be determined, which may depend, for example, on whether a user of the motor vehicle is sitting very far forward or very far rearward, or has long arms for example. In other words, a criterion for the position of the holding element may be that the mobile terminal 28 should be easily reachable after placement (and while charging). In the example from FIG. 1, the determined position may be, for example, the armrest shown in FIG. 2.

The holding surface form default signal generated by the control unit 30 in method step S4 can then describe, for example, the exemplary armrest as a preferred charging device 12, the form of the mobile terminal 28, and a position further forward on the holding surface 20. In order to form the holding element (S5), which can be formed in FIG. 1 by the lowered rod elements 16 and designed as a charging cradle or charging base, the adjustment device 22 can shift the rod elements 16, which are shown lowered in FIG. 1, downward by one centimeter or by two centimeters, for example. This lowering can be described by the generated holding area form default signal, which may describe a precise instruction, for example by means of coordinates of the individual rod elements 16 to be lowered, as to which of the rod elements 16 of the charging device 12 should be adjusted. In order to transfer the holding area form default signal (S6), it can be transmitted to the adjustment device 22 via the exemplary data bus.

The position of the holding element and thus the holding position of the mobile terminal 28 can be shifted on the holding element, for example after placement of the mobile terminal 28, in which some of the rod elements 16 are lifted, for example, on one side of the mobile terminal, while some of the rod elements 16 are lowered on another side of the mobile terminal 28. The ascending rod elements 16 exert a compressive force onto the one end of the mobile terminal 28, and the descending rod elements 16 on the other end of the mobile terminal 28 no longer form any resistance such that the mobile terminal 28 slides in the direction of the descending rod elements 16 and changes its position.

This can occur, for example, if the user shifts the body posture or body position or, for example, the vehicle seat. The position or location change (S7) can be determined, for example, with the assistance of the signal from the sensor 48, regarding which the control unit 30 may have, for example, software to determine body posture. In order to adjust the current position of the holding element (S8), a readout can occur, for example, as to which of the rod elements 16 are being lowered. In order to determine a suitable, alternative position, coordinates of the holding surface 20 can be compared, for example, to a coordinate system of an interior of the motor vehicle 10, wherein the coordinates at which the body of the user is situated may also be described, for example, in the coordinate system. In order to determine the alternative position, the corresponding coordinates can then be compared to one another for example.

In order to position the holding element, the control unit 30 can then generate a further holding area form default signal (S10), which can describe the new holding position. This further holding area form default signal can also be transferred (S11) to the adjustment device 22.

In order to display the holding element, i.e. the exemplary cradle or charging base, a corresponding lighting signal can be generated (S12), which can be transferred (S13) to the output device 36. The exemplary lighting of the holding element/or the holding surface 20 by a lighting device with a lighting element 38 has already been previously described (see FIG. 2, method step S14) as has the optional displaying of display content (S15) by one or more output devices 36 (see FIG. 14).

Figure 7:
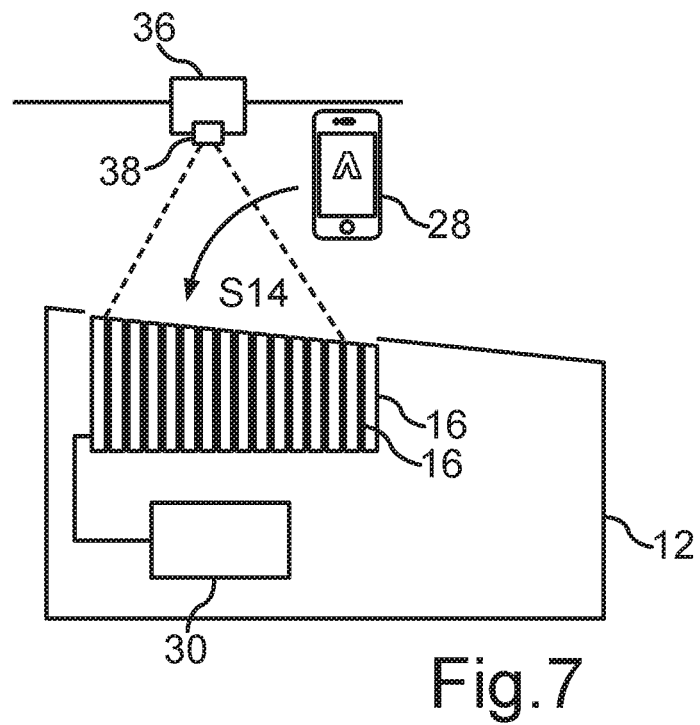
FIG. 7 a schematic view of a further embodiment of the charging device according to the invention and of a further embodiment of the method according to the invention.

FIG. 7 shows an exemplary embodiment of the charging device 12, wherein a logo of the mobile terminal 28 can be projected by means of an exemplary output device 36 of the rod elements 16, for example by a light-DPR interaction. The logo in this case may appear, for example, with a contour. In other words, the control unit 30 can couple or coordinate the adjustment of the rod elements 16 and the display.

The previously described method steps of the example in FIG. 1 represent optional method steps. The method according to the invention for charging the energy storage device 44 initially comprises the process of providing the holding element (S15), which can occur through adjustment of the at least one rod element 16, preferably a selection of several rod elements 16. In order to charge the energy storage device (S16) by means of the energy output device 24, the control unit 30 can generate a charging signal (S17), which may describe, for example, an activating of the respective energy output elements 26 that are situated in an actuated rod element 16. The charging signal is then transferred (S18) to the energy output device 24 via the exemplary data bus.

In order to determine the corresponding rod elements 16 (S22), the determined form of the mobile terminal 28, for example, can be used as well as the previously mentioned body location or body position. Once the current or suitable position has been determined (S19), the respective rod elements 16 that form the holding element (S20) can be determined.

For example, only those energy output elements 26 can be activated or only those rod elements 16 having direct contact with the mobile terminal 28, which are situated at a position of the energy storage device 44. In order to determine the position and/or location of the energy storage device 44 (S21), corresponding information from a digital datasheet of the model of the mobile terminal 28, for example, can be read out. The activating of the corresponding rod elements 16 and/or energy output elements 26 may then depend on which rod elements 16 are determined to be arranged on the energy storage device 44 (S22).

As a whole, the examples show how an intelligent and adaptive charging of a mobile terminal 28 is enabled by the invention by means of at least one rod element 16, for example several rod elements 16, which may be designed, for example, as pins.

According to a further exemplary embodiment, rod elements 16 designed as intelligent and adaptive pins ensure that the user of the motor vehicle 10 can easily inductively charge the mobile terminal 28 and only transfer energy to where it is needed.

According to a further exemplary embodiment, for example a modern, future interior can determine, for example by means of a sensor device with a sensor 48, what type of mobile terminal 28, i.e. which model of the mobile terminal 28, the user is carrying as soon as the user approaches and/or enters the motor vehicle 10. By means of a large database, for example, type-specific information can be retrieved in real time regarding this mobile terminal 28, for example a size, a structure, information as to where the charging unit, i.e. the energy storage device 44, is located, for example a battery, or information regarding materiality. This information, for example, then reaches a system of the motor vehicle or of the motor vehicle manufacturer and can be processed, for example, and instantly forwarded to the rod elements 16.

According to a further exemplary embodiment, the exemplary smart pins, i.e. the rod elements 16, can be installed as a large-scale system in the motor vehicle 10 with the goal that the mobile terminal 28 is recognized, recorded, fixed in position, and selectively and efficiently inductively charged, regardless of where the mobile terminal 28 is placed.

According to a further exemplary embodiment, a coupling, for example, to a light projection and/or the rod elements 16 can start to illuminate, for example by means of the previously described output devices 36. The coupling can precisely define where the mobile terminal 28 should best be placed on the generous surface (also cf. FIG. 2, FIG. 3, FIG. 4, and FIG. 13). An optimal recess, for example, can then be created according to the contour of the mobile terminal 28 (cf. FIG. 2).

According to a further exemplary embodiment, the rod elements 16 may be designed, for example, such that they can ascend and/or descend. For example, they can be used only where they are required. For example, if the mobile terminal 28 is positioned on the rod elements 16, for example only those rod elements 16 that are required can establish, for example by ascending, an inductive charging connection. The other rod elements 16 can lie dormant, i.e. cannot be adjusted. The position of a particular assembly can be determined, for example, by means of a datasheet of the mobile terminal 28.

Upon removal of the mobile terminal 28, it may preferably be provided that the at least one rod element 16 can push the mobile terminal 28 upward in order to enable perfect removal.

According to a further exemplary embodiment, the rod elements 16 may emit an acoustic and/or visual and/or physical and/or haptic signal, for example by means of the output device 36, so that the mobile terminal 28 is not forgotten when the motor vehicle 10 is exited. For example, a message can appear on an exemplary screen and/or a voice of artificial intelligence, for example, can generate the words "don't forget me" by means of an exemplary speaker.

The rod elements 16 can preferably be created throughout the motor vehicle 10; thus, the rod elements 16 can preferably also be used as extra antennas to improve the signal. This increases the range and stabilizes the network.

Alternative or additional information and/or services can be obtained from the mobile terminal 28 by means of the exemplary screens on the rod elements 16, for example via a mirror-link function known from the prior art to one skilled in the art. This information or these services may appear, for example, as quick access, for example as a message such as "Power charging possible—yes or no—99 cents extra." Such a service can be offered, for example, in public transport, for example in a taxi. With the assistance of the charging device 12 according to the invention, a service of a quick charging process of 15 minutes can optionally be offered in such means of transport for example. This information may alternatively or additionally appear, i.e. be generated, on an existing screen of the mobile terminal 28.

According to a further exemplary embodiment, the at least one rod element 16 may generate, for example, a visual and/or acoustic and/or physical signal, preferably when the charging process starts and/or is interrupted and/or ends. The rod elements 16 can be used as a signal amplifier, antennas, and/or for stabilization of the connection, as previously described.

According to a further exemplary embodiment of the method according to the invention, each individual rod element 16, for example, may have the possibility of performing the process of individual charging. Each of the rod elements 16 can be individually activated, for example depending on application, and can thus adaptively respond, for example descend, ascend, charge, and/or illuminate, individually based on various situations. For example, each of the rod elements 16 can transmit a visual and/or haptic signal by means of optional, installed light conductors of the optional output device 36.

For example, individual rod elements 16 can be equipped with small screens of an output device 36, which can display information that may be relevant for the user depending on the usage. Optionally, the surface of the rod elements 16 may be scratch-resistant, for example, and designed such that so-called rubber buffer bars ensure that the mobile terminal 28 is not scratched and has an improved or perfect hold (cf. FIG. 14).

FIG. 1 shows an example of a charging device 12 with rod elements 16, which adapt to all objects and can hold them well. Additional retrieved information, service offers, and/or notifications can be generated by means of the output device 36. Optionally, the rod elements 16 may each be designed as a button or have touchscreens for example. Rod elements 16 with an inductive charging device, for example, can ensure wireless charging.

FIG. 3 shows exemplary rod elements 16, which link up and can connect the motor vehicle 10 as antennas for amplifying a signal and generate a stable and secure connection, for example, to a provider or satellites.

FIG. 4 shows an example of a system, which knows where a respective component, i.e. also the energy storage device 44, can be located, for example, by means of a retrieved datasheet of the mobile terminal 28. The rod elements 16 required for inductive charging can ascend and link up. This enables selective and efficient charging.

FIG. 6 shows a possible stepless movement of the rod elements 16, for example in the Z direction, thus along a motor vehicle vertical axis for example.

FIG. 7 shows an exemplary light-DPR interaction, wherein a logo of the mobile terminal 28, which may be designed, for example, as a telephone or tablet PC, may appear with a contour.

Figure 8:
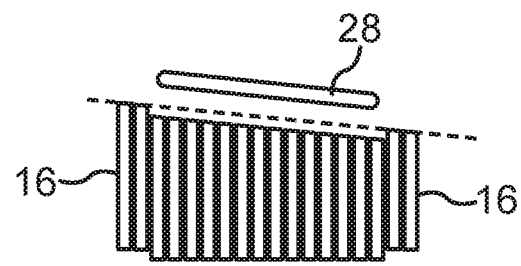
FIG. 8 a schematic view of a further embodiment of the charging device according to the invention and of a further embodiment of the method according to the invention.

FIG. 8 shows an exemplary embodiment indicating how the exemplary DPR system can descend, for example, and thereby form, for example, a charging base or contour base. The dashed line in this case shows a plane of the non-descended rod elements 16. According to the example in FIG. 8, the cross-sectional surfaces 18 of the individual rod elements 16 may be chamfered at an angle for example.

Figure 9:
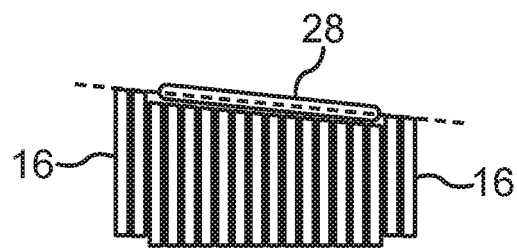
FIG. 9 a schematic view of a further embodiment of the charging device according to the invention and of a further embodiment of the method according to the invention.

FIG. 9 shows the mobile terminal 28, which is placed in the contact base, i.e. in the holding element, shown in FIG. 8. In doing so, contact can be established between the mobile terminal 28 and the corresponding rod elements 16 and/or the energy output elements 26.

Figure 10:
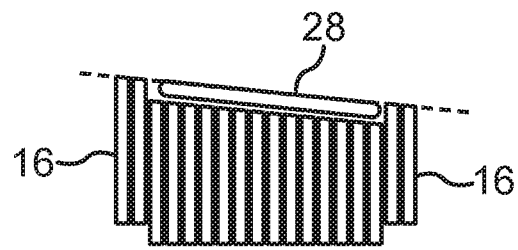
FIG. 10 a schematic view of a further embodiment of the charging device according to the invention and of a further embodiment of the method according to the invention.

FIG. 10 shows an example of rod elements 16 that are evenly lowered with respect to the holding surface 20.

Figure 11:
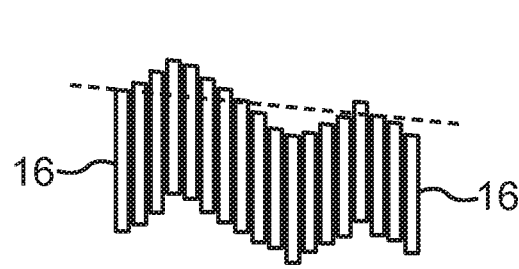
FIG. 11 a schematic view of a further embodiment of the charging device according to the invention and of a further embodiment of the method according to the invention.

FIG. 11 shows an example of a shaft formed by the rod elements 16, wherein the mobile terminal 28, for example, can be shifted with such a shaft.

Figure 12:
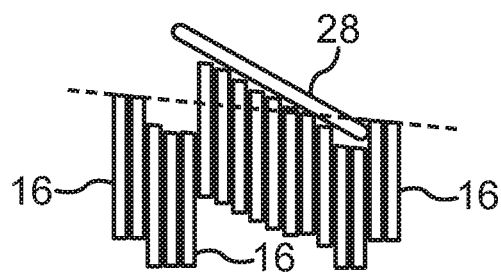
FIG. 12 a schematic view of a further embodiment of the charging device according to the invention and of a further embodiment of the method according to the invention.

FIG. 12 shows an exemplary configuration of the rod elements 16 upon removal of the mobile terminal 28, wherein some of the rod elements 16 are lifted or pushed, for example, further out of the charging device 12 in order to emphasize the mobile terminal 28 such that a user can easily grasp it.

FIG. 13 shows exemplary rod elements 16, which descend, wherein an exemplary overall screen composed of several individual screens can record the structure.

Finally, FIG. 14 shows a soft contact surface to the exemplary pins, which provide support and protect the mobile terminal 28 from the rod elements 16 and are intended to minimize slipping within the recess, for example by means of rubber buffer bars of the scratch protection device 46.

The invention claimed is:

1. A charging device for a motor vehicle, comprising:
a plurality of rod elements each having a first end with a cross-sectional surface, which forms a part of a holding surface of the charging device, wherein a main extension axis of each rod element intersects the part of the holding surface such that a second end, opposite the first end, of each rod element is facing away from the part of the holding surface and protrudes into the charging device, wherein each of the rod elements is arranged to be adjustable along its respective main extension axis, and wherein the respective cross-sectional surfaces form a part of the holding surface;
an adjustment device for adjusting one or more of the plurality of rod elements along its respective main extension axis, each of the rod elements adjusted independently of the other rod elements; and
an energy output device with at least one energy output element, wherein the energy output device is designed to output energy via at least one of the plurality of rod elements to an energy storage device by means of the energy output device.

2. The charging device according to claim 1, further comprising: an antenna device for providing a data communication connection.

3. The charging device according to claim 2, further comprising:
an output device, which has at least one output and/or at least one lighting element, wherein the at least one output and/or at least one lighting element is arranged in and/or on the cross-sectional surface of the first end of the at least one rod element.

4. The charging device according to claim 1, further comprising:
a scratch protection device, which at least partially covers a part of a surface of the at least one rod element.

5. The charging device according to claim 4, further comprising:
an output device, which has at least one output and/or at least one lighting element, wherein the at least one output and/or at least one lighting element is arranged in and/or on the cross-sectional surface of the first end of the at least one rod element.

6. The charging device according to claim 1, further comprising:
an output device, which has at least one output and/or at least one lighting element, wherein the at least one output and/or at least one lighting element is arranged in and/or on the cross-sectional surface of the first end of at least one of the plurality of rod elements.

7. A method for charging an energy storage device of a mobile terminal, comprising the following steps executed by a control unit:
charging a device;
providing a holding element for storing a mobile terminal, wherein the holding element is formed by a totality of cross-sectional surfaces, which form the part of the holding surface;
generating a charging signal, which describes an activating of at least one energy output element;
transferring the generated charging signal to an energy output device for outputting the energy to the energy storage device of the mobile terminal;
determining a current or suitable position and/or location of the mobile terminal on the charging device; and
determining the respective rod element or the respective rod elements, which form the holding element, as a function of the determined position and/or location; and
wherein the charging signal describes the determined rod element or the determined rod elements.

8. The method according to claim 7, wherein the following steps executed by the control unit:
determining a position and/or location of the energy storage device in the mobile terminal; and
determining the respective rod element or the respective rod elements, which are arranged or will be arranged on the energy storage device, as a function of the determined position and/or location of the energy storage device;
wherein the charging signal describes the determined rod element or the determined rod elements.

9. The method according to claim 7, further comprising the following steps executed by the control unit of an interior trim element of the motor vehicle:
determining a form of a mobile terminal, which is situated in an interior of the motor vehicle;
determining a position on the charging device, which is suitable for storing the mobile terminal;
generating a holding surface form default signal, which describes an adjustment of the at least one rod element of the charging device along its main extension direction, as a function of the determined form of the mobile terminal and the determined position, such that the part of the holding surface, which is formed by a totality of cross-sectional surfaces, forms a holding element, which is at least partially fitted to the determined form, in the determined position; and transferring the holding surface form default signal to the adjustment device of the charging device in order to adjust the at least one rod element, and thereby form the holding element.

10. The method according to claim 9, further comprising the following step executed by the control unit:

determining a model of the mobile terminal;

wherein the determining of the form of the mobile terminal takes place by means of the determined model.

11. The method according to claim 9, further comprising the following steps executed by the control unit:

determining a position or location change of a body of the user;

determining a current position of the holding element;

determining an alternative position of the holding element, in which the mobile terminal stored in the holding element is more easily accessible to the user from the changed body position and/or body location, as a function of the determined position and/or location change;

generating a further holding surface form default signal, which describes an adjustment of a plurality of rod elements for moving the holding element from the current position into the determined alternative position; and transferring the further holding surface form default signal to the adjustment device.

12. The method according to claim 9 for operating a charging device according to an output device, which has at least one output and/or at least one lighting element, wherein the at least one output and/or at least one lighting element is arranged in and/or on the cross-sectional surface of the first end of the at least one rod element, comprising the following steps executed by the control unit:

generating a lighting signal, which describes a lighting of the holding element by a display content to be displayed and/or by light, as a function of the determined suitable position on the charging device and/or a position of the holding element; and transferring the generated lighting signal to the output device of the charging device for a) controlling the output and/or lighting element of the at least one rod element; and/or b) controlling the lighting element that impacts the at least one rod element with light.

13. A control unit, preferably having a processor device, wherein the control unit is configured to execute process steps affecting a control unit according to claim 7.

* * * * *